(No Model.)

J. JOHNSON.
GULLEY OR STENCH TRAP.

No. 595,949.

2 Sheets—Sheet 1.

Patented Dec. 21, 1897.

Witnesses
Geo Tuey
A F Biddle

Inventor
Joseph Johnson

THE NORRIS PETERS CO., PHOTO-LITHO., WASHINGTON, D. C.

(No Model.) 2 Sheets—Sheet 2.

J. JOHNSON.
GULLEY OR STENCH TRAP.

No. 595,949. Patented Dec. 21, 1897.

Witnesses
Geo Suess
A. F. Biddle

Inventor
Joseph Johnson

United States Patent Office.

JOSEPH JOHNSON, OF BILSTON, ENGLAND.

GULLY OR STENCH TRAP.

SPECIFICATION forming part of Letters Patent No. 595,949, dated December 21, 1897.

Application filed July 27, 1897. Serial No. 646,131. (No model.) Patented in England May 12, 1896, No. 10,028.

*To all whom it may concern:*

Be it known that I, JOSEPH JOHNSON, a subject of the Queen of Great Britain, residing at Bilston, in the county of Stafford and Kingdom of England, have invented certain new and useful Improvements in Gully or Stench Traps, (for which I have obtained Letters Patent in Great Britain, No. 10,028, dated May 12, 1896,) of which the following is a specification.

This invention relates to improvements in gully or stench traps adapted for use in connection with the draining of streets, yards, stables, slaughter-houses, and the like, and also for sinks, baths, lavatories, urinals, and general domestic purposes; and it consists in constructing and fitting the same in such a manner that they are more effective in their action and less likely to get out of order than hitherto.

The advantages obtained by the said improvements are, first, a more perfect seal upon the drains against the escape of sewer-gas; second, the seal-waters cannot become frozen in winter or evaporated in hot weather; third, the drains can never become seriously stopped; fourth, vermin, such as rats, cannot come therethrough; fifth, the trap can be cleaned without breaking the seals and without tools; sixth, no brick or stone work is required to form a lead thereto from the surface, and, seventh, the efficiency thereof to cope with any extra flushes owing to storms.

The improvements consist in constructing a combination cesspool and seals within the interior of the lower part of the trap and protecting and governing the same by a perforated winged plate or riddle constituting a lid thereto, and also, in combination therewith, in providing and fitting the said trap with a mud-receiver arranged in such a manner within the interior as to first receive the whole of the matter flowing into the said trap and to separate the solids from the liquids before the latter are allowed to pass to the seals and drain-pipe.

Figure 1:
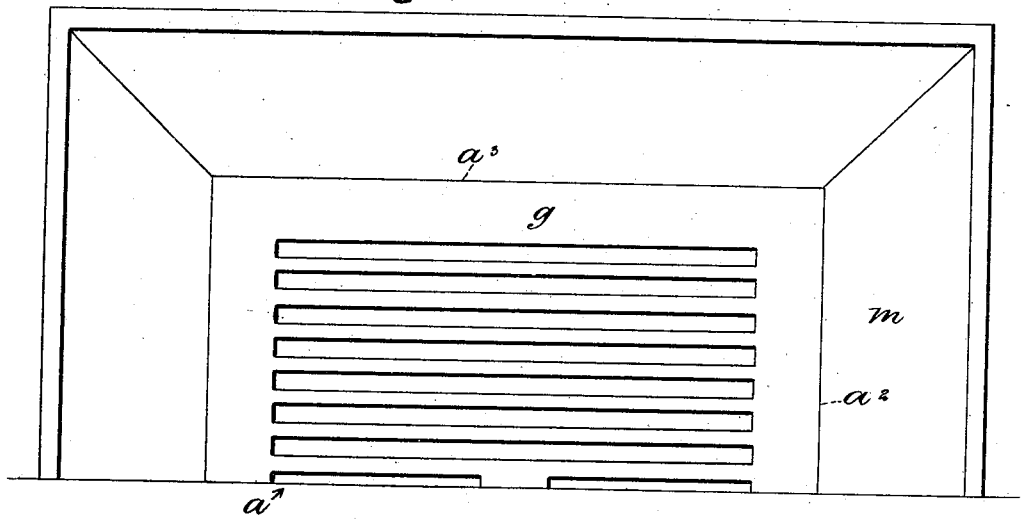
Figure 2:
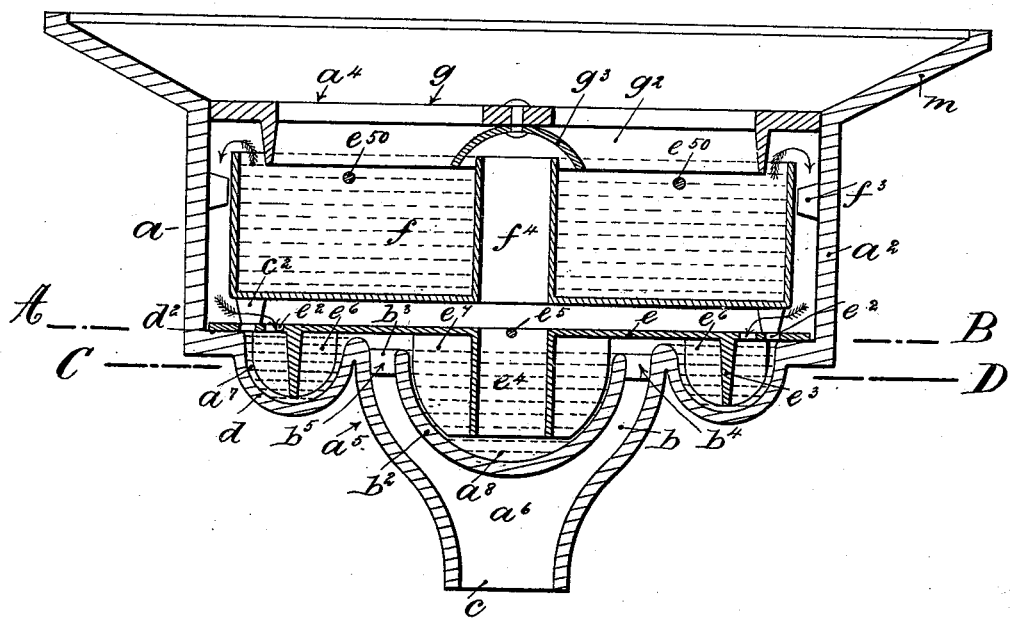
Figure 3:
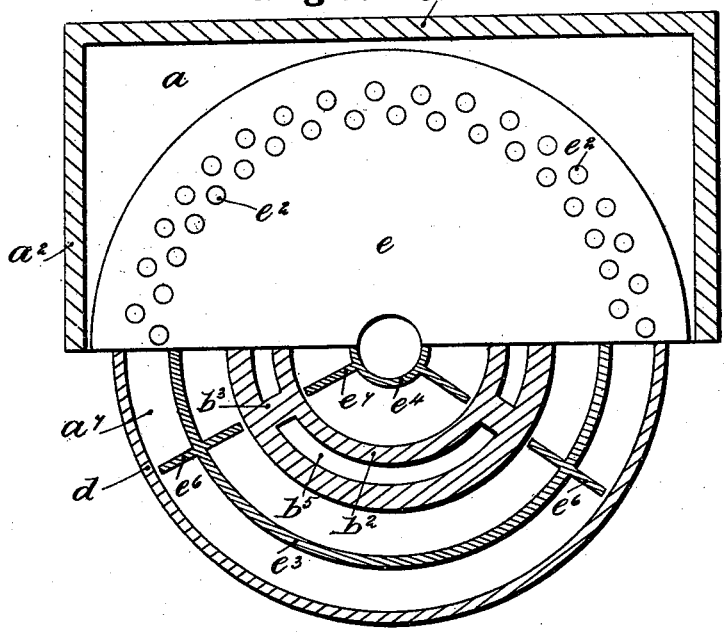
Figure 4:
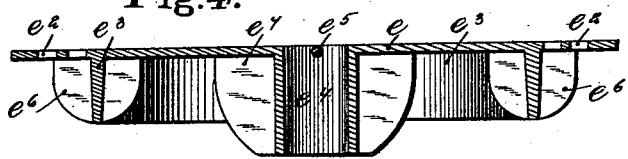

In the accompanying sheets of drawings the invention is practically illustrated, Figures 1, 2, and 3 representing, respectively, a part plan, a vertical section, and a horizontal section of a gully-trap suitable for use upon streets, the last figure showing semisections upon the lines A B and C D, Fig. 2. Fig. 4 represents separately a section of the winged and perforated cover-plate which constitutes a lid to the seal-chambers.

The same letters of reference indicate like parts in all of the figures.

The body of the gully-trap $a$ somewhat resembles a rectangular-shaped box, being composed of side walls $a^2$, end walls $a^3$, and partially-closed bottom $a^5$, the top $a^4$ thereof, which is an open one, being closed by a lid or grating $g$, as hereinafter described. The central part of the partially-closed bottom $a^5$ is fashioned into an outlet $a^6$, surrounding which, on both sides, are the seal-water chambers $a^7$ $a^8$, the latter being hereinafter more fully described. The outlet $a^6$ consists of a down-pipe part or neck $c$, branching upward toward the trap into a circular enlargement $b$, centrally disposed, within which is a bowl or cup $b^2$, supported by webs $b^3$, projecting across the mouth $b^4$ of the said circular enlargement $b$, the said webs being spaced by openings $b^5$, constituting outlets from the trap-body to the down-pipe part or neck $c$. Surrounding the circular enlargement and formed in one piece with it is the seal-water chamber $a^7$, hereinbefore mentioned, consisting of a circular or other-shaped channel or gutter $d$, sunken within the bottom $a^5$ of the trap $a$, a ledge part $d^2$ of the trap-bottom being formed upon the boundary thereof to support a perforated cover-plate $e$, permanently fitted within the hollow interior of the trap-body. This cover-plate $e$, which can be made of any suitable material, has holes or piercings $e^2$ formed vertically therethrough, a ring-flange $e^3$, dipping into the seal-water chamber $a^7$, and a central tubular part $e^4$, adapted to depend into the seal-water chamber $a^8$, depending from its under side, a bar $e^5$ being fitted across the top of the depending part $e^4$ to constitute a handle to the said plate. The piercings $e^2$ in the plate $e$ are arranged outside the ring-flange $e^3$, or upon the boundary thereof, that part of the plate between the said flange and the pipe $e^4$ being entire. At certain distances apart upon the ring-flange $e^3$ and also upon the pipe $e^4$ wings or rightangled rigid extensions (respectively marked $e^6$ $e^7$) are formed, which dip well into the seal-water chambers $a^7$ and $a^8$, respectively, their function being to stir up and remove settled matter lying within the said chambers when the cover-plate $e$, carrying them, is turned, and so to cleanse the seals formed by the water in conjunction with the flange $e^3$ and the pipe $e^4$.

Standing upon the cover-plate $e$, as aforesaid, by means of feet $c^2$, and also centrally supported by means of lugs $f^3$, standing out from the inner walls of the trap $a$, is a mud-receiver or precipitation-tank $f$, consisting of an open-topped inclosure having projecting upward from its center a stand-pipe $f^4$, adapted to come coincident with the depending pipe $e^4$ of the cover-plate $e$, as before described. Bars $e^{50}$ are provided across the open part of this mud-receiver to enable it to be bodily lifted from the trap for the purpose of being emptied of its contents, and depending thereinto and below the top edge of the same is a flange $g^2$ and a dome-like cover part $g^3$, both carried by the removable trap lid or grating $g$, which rests upon lugs formed upon the walls of the open top $a^4$ of the trap $a$. This mud-receiver is fitted to the interior of the trap-body for the purpose of collecting all solid particles and heavy matter in suspension from the liquid flowing therethrough to the drain and when in actual use constitutes, in conjunction with its stand-pipe $f^4$, the lip or flange $g^2$ and dome part $g^3$ of the grid or lid $g$, a surface water seal against any decomposed matter which may congregate upon the trap or upon the cover-plate and mud-receiver.

The construction and arrangement of the outlet $a^6$ are important, the opening $b^5$, constituting the mouth thereof, being so contracted in width as to prevent any vermin coming therethrough, while at the same time the area of the outlet exceeds that of the down-pipe or neck $c$. The mud-receiver $f$ is adapted to be lifted bodily from the trap, while the cover-plate $e$ remains therein and is capable of being rotated. By the provision of this cover-plate $e$ the bottom seals are permanent even while the trap and its mud-receiver are being cleansed.

A boundary-flange $m$ is provided in one piece with the trap-body and adjacent to the grid top of the trap, which enables the setting of the trap without the necessity of a coping of brick or stone work.

In actual work the sewage or refuse water first flows into the mud-receiver or precipitation-tank $f$, the sides of which, and also those of the stand-pipe, it overflows and takes the direction of the arrows shown in Fig. 2 to the seal-water chambers $a^7$ $a^8$, and from thence through the openings $b^5$ of the outlet to the drain-pipe, the thick or solid parts of the sewage being deposited in its course.

The gully-trap and its parts may be made of metal or earthenware and the details altered within certain limits without departing from the invention.

Having now described my invention, what I claim, and desire to secure by Letters Patent, is—

1. In a gully or stench trap, the combination with the outer casing having in its bottom an annular water-seal chamber and a central outlet portion, of a water-seal chamber supported in said outlet portion and a cover-plate for said chambers having perforations above and an annular plate projecting into the annular chamber and a depending pipe extending into the central water-seal chamber, substantially as described.

2. In a gully or stench trap, the combination with the outer casing having in its bottom an annular water-seal chamber and a central outlet portion, of a water-seal chamber supported in said outlet portion, a cover-plate for said chambers having perforations above and an annular plate projecting into the annular chamber and a depending pipe extending into the central water-seal chamber, and flanged wings or scrapers carried by said cover-plate and projecting into the water-seal chambers, substantially as described.

3. In a gully or stench trap, the combination with the outer casing having in its bottom an annular water-seal chamber and a central outlet portion, of a water-seal chamber supported in said outlet portion, a cover-plate for said chambers having perforations above and an annular plate projecting into the annular chamber and a depending pipe extending into the central water-seal chamber, and a mud-tank supported above said cover-plate and having an upward-extending stand-pipe therein, substantially as described.

4. In a gully or stench trap, the combination with the outer casing having in its bottom an annular water-seal chamber and a central outlet portion, of a water-seal chamber supported in said outlet portion, a cover-plate for said chambers having perforations above and an annular plate projecting into the annular chamber and a depending pipe extending into the central water-seal chamber, and a mud-tank supported above said cover-plate having an upward-extending stand-pipe therein and affording an annular passage between its wall and the wall of the outer casing, substantially as described.

5. In a gully or stench trap, the combination with the outer casing having in its bottom an annular water-seal chamber and a central outlet portion, of a water-seal chamber supported in said outlet portion, a cover-plate for said chambers having perforations above and an annular plate projecting into the annular chamber and a depending pipe extending into the central water-seal chamber, a mud-tank supported above said cover-plate having an upward-extending stand-pipe therein and affording an annular passage between its wall and the wall of the outer casing and a grid supported by said outer casing having an annular plate projecting into the mud-tank and carrying in its central portion a dome-shaped plate supported above said stand-pipe, substantially as described.

In testimony whereof I have signed this specification in the presence of two subscribing witnesses.

JOSEPH JOHNSON.

Witnesses:
GEO. AVERY,
A. F. BIDDLE.